Feb. 9, 1943. D. FINLAYSON ET AL 2,310,359
CORD ASSEMBLY, PARTICULARLY FOR PARACHUTES
Filed Nov. 22, 1940
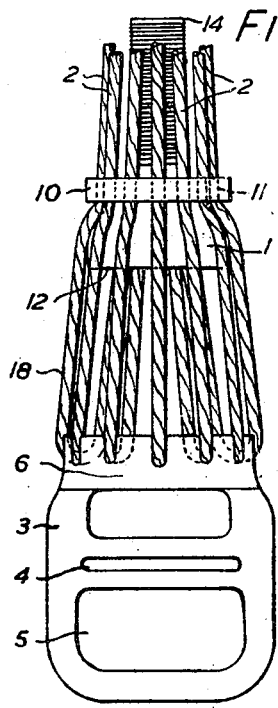
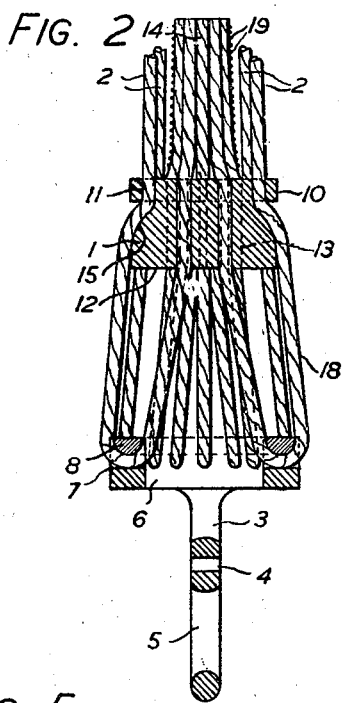
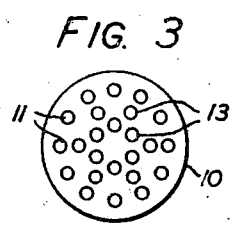
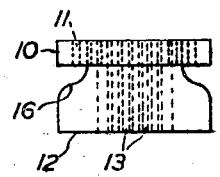
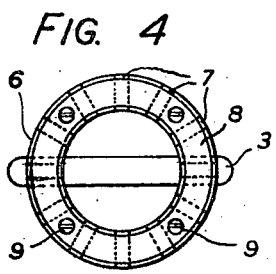
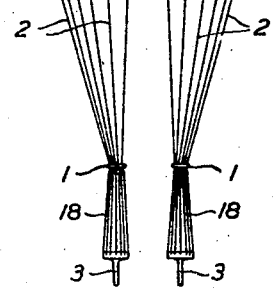
D. FINLAYSON
E. J. GREENWOOD
L. LATHAM
INVENTORS
ATTORNEYS Patented Feb. 9, 1943

2,310,359

UNITED STATES PATENT OFFICE 2,310,359

CORD ASSEMBLY, PARTICULARLY FOR PARACHUTES

Donald Finlayson, Ernest Leslie Greenwood, and Leonard Latham, Spondon, near Derby, England, assignors to Celanese Corporation of America, a corporation of Delaware Application November 22, 1940, Serial No. 366,566 In Great Britain December 8, 1939

9 Claims. (Cl. 244—151)

This invention relates to cord assemblies, being particularly concerned with a cord or shroud line assembly for connecting the fabric or canopy of a parachute with the harness thereof.

In U. S. application S. No. 286,862 filed July 27, 1939 now matured into Patent 2,267,791 of Dec. 30, 1941 there is described a shroud line assembly comprising a number of cords looped so as to reduce their length and adapted to extend to their full length when under load and in so extending to develop a frictional effort resisting extension and applied externally of the cords in order to absorb shock occurring on opening of the parachute canopy. A particular form of parachute shroud line attachment for this purpose described in the prior specification comprises a bulbous body and means, in the form of flanges perforated for the passage of the cords, to constrain the cords to pass close to each end of an axis of said body, so that they pursue a curved path round said body and develop the friction in contact therewith. The present invention is particularly concerned with an improvement in this form of attachment for the purpose of absorbing shock.

According to the present invention a parachute shroud-line attachment comprises a common sliding member to which the ends of a number of cords may be connected, said member being adapted to engage a part of the length of each of said cords and to exert sliding friction thereon, and a common connecting member having, for each cord, a passage through which the cord may pass between said part of its length and its end, said passages being evenly spaced radial passages symmetrically disposed about the axis of the connecting member. By the provision, in the shroud-line assembly, of an attachment through which the loops of cords pass symmetrically all the cords are treated in the same manner so that the absorption of shock is uniformly distributed between the cords, and the attachment is rendered self-centering so that the possibility, by differential treatment of the cords, of tilting the connecting member and/or jamming the cords is substantially reduced or avoided.

The sliding member may be of the bulbous kind described in U. S. application S. No. 286,862 filed July 27, 1939 now matured into Patent 2,267,791 of Dec. 30, 1941. Since, however, the connecting member guides the cords symmetrically, it is only necessary to provide one flange to constrain the cords to pass close to the axis of the bulbous body on the side thereof remote from the connecting member. The cords may then pass, parallel to one another, from the greatest diameter of the bulbous body (which may be cut off or truncated at or near this point) to the connecting member. By these means the cords are not constrained to pass close to the axis on the side nearest the connecting member, so that interference between the two runs of the loop in each cord is avoided.

A further feature of the invention is the provision in the sliding member to which the ends of the cords are all connected, of a separate hole through which the end of each cord is passed for the purpose of such connection. This enables the disposition of the cords as they pass from the connecting member to the sliding member to be determined with certainty so that the avoidance of interference between the cords is further facilitated, and the ends of the cords emerging from the holes are neatly and symmetrically disposed for being wrapped and sewn together.

By way of example, a form of shroud-line attachment according to the invention will now be described in greater detail with reference to the accompanying drawing, in which:

Figure 1 is a front elevation, and

Figure 2 a sectional side elevation of the attachment,

Figure 3 is a plan view of the sliding part of the attachment,

Figure 4 is a plan view of the connecting part of the attachment,

Figure 5 is a side elevation of an alternative form of sliding part to that shown in Figures 1 and 2, and Figure 6 is a diagrammatic view of a parachute provided with two shroud-line assemblies in accordance with the invention.

Referring to Figures 1–4 the attachment, which together with the cords constitutes the shroud-line assembly, is in two parts, the part 1 being a sliding part to which the ends of all the cords 2 are attached, while the other part 3 is a connecting part round which all the cords 2 are looped and by means of which the loops are connected to the parachute harness. The connecting part 3 is attached to the harness of the parachute by means of slots 4, 5 for the reception of the straps of the harness. An annular member 6 of about 2″ external diameter is provided, formed integrally with the portion carrying the slots 4, 5. The attachment is adapted to take twelve of the cords 2, and for this purpose the annular member 6 is provided with twelve slots, indicated at 7, and formed by drilling radial holes symmetrically round the member 6 and slotting out the holes upwards so as to form deep grooves. An annular groove of semi-circular cross-section is turned out of the face of the member 6 on which the twelve slots 7 emerge, and into this groove is welded and screwed a metal ring 8 of the same semi-circular section, screws 9 being provided to hold the ring 8 in position during and after welding. The whole of the member 3, after construction, is smoothed and polished.

The sliding part 1 of the attachment comprises a bulbous body having a flange 10 on the upper side through which twelve holes 11 are symmetrically drilled at a radius of $\frac{11}{16}$". The lower face 12 of the bulbous body is truncated at its maximum diameter of a little under 1½", the truncated face 12 being adapted to fit snugly against the upper face of the annular member 6 of the connecting part 3. Twelve further holes 13 are drilled through the whole thickness of the member 1 the holes 13 being disposed symmetrically round the axis of the member 1 in two rings of six holes each.

Each of the parachute cords 2, as it comes from the canopy of the parachute, passes through one of the holes 11 in the flange 10 of the sliding member 1. It then passes downwards over the bulbous body, being forced outwards thereby, and passes inwards through one of the slots 7 in the connecting member 3. Each cord then turns through approximately 180° round the curved part of the section of the ring 8, returns to the sliding member 1, and passes through one of the holes 13. The ends of the twelve cords rising through the holes 13 are firmly secured together into a tail 14 so that none of the ends can be drawn back through its hole 13.

The ends of the cords 2 forming the tail 14 may conveniently be bound together by means of an adhesive thread indicated at 19 in Figure 2. A suitable thread for this purpose is a cotton thread of 2/34's count that has been run through an adhesive mixture at a temperature of about 120° C., the adhesive mixture comprising one pint of castor oil added to 4 pints of molten rosin. The adhesive thread used for this purpose is of a kind adapted for the joining of heavy denier warps during weaving (e. g. warps of saponified or unsaponified stretched cellulose acetate yarn of 3,300, 4,800, or 7,200 denier), by overlapping the ends to be joined by about 1" and wrapping them with the adhesive thread. When used for the purposes of the present invention, the adhesive thread secures the ends of the cords 2 firmly together in the form of the tail 14.

As previously stated, the cords 2, in passing over the bulbous body 1 after emerging from the holes 11, are deflected outwards by the bulge of the body. A large part of the friction which it is desired to apply to the cords is developed at this point of deflection, and consequently the form of the bulge is of considerable importance. It has been found that if the cords follow a curved path round the shoulder 15 of the bulbous body 1 of an internal radius (i. e. the external radius, in a vertical plane, of the body 1) of between $\frac{17}{32}$" (as indicated at 15 in Figures 1 and 2) and $\frac{7}{8}$" (as indicated at 16 in Figure 5) the cords slide sufficiently freely, and the smaller this radius, the less freely the cords slide. The forms of the body 1 shown in Figures 2 and 5 respectively represent roughly the convenient limits of this radius in a device of the general form shown.

In the usual form of parachute twenty-four cords are employed so that, as indicated diagrammatically in Figure 6, two of the attachments described above will be required to accommodate them. In Figure 6 the two attachments are each indicated at 1, 3, the cords 2 proceeding from the canopy 17 of the parachute to the member 1, and thence to the member 3 and back to the member 1. In packing a parachute, the two parts 1, 3 of each attachment are separated by a distance of about 2' 6", so that there is a length of 5' of each cord included in the loop 18 between the member 1 and the member 3. When the canopy 17 of the parachute opens, under the influence of a smaller pilot parachute 20, the shock of opening is transmitted from the canopy 17 to the members 3. The loops 18, between the members 3 and the members 1, however, close under the shock by the sliding of the cords 2 over the bulbous member 1 and over the ring 8 on the connecting member 3. In this way the shock developed by the opening of the canopy 17 is absorbed in the friction involved in this sliding action. When the loops 18 are closed, the two parts 1 and 3 of the attachment fit snugly face to face, the arrangement of the cords 2 being such that the cords run directly from the inner ends of the slots 7 of the members 3 to the holes 13 in the member 1, the holes 13 being disposed wholly within the internal radius of the annular member 6 so that the cords do not fall between the faces of the two parts 1 and 3.

Having described our invention, what we desire to secure by Letters Patent is:

1. A parachute shroud-line attachment comprising a common sliding member to which the ends of a number of cords may be connected, said member being adapted to engage a part of the length of each of said cords and to exert sliding friction thereon, and a common connecting member having, for each cord, a passage through which said cord may pass between said part of its length and its end, said passages being evenly spaced radial passages symmetrically disposed about the axis of the connecting member.

2. A parachute shroud-line attachment comprising a common sliding member to which the ends of a number of cords may be connected, said member having a bulbous body and a flange on one side thereof which is perforated for the passage of each of said cords so as to constrain said cords to pass close to the axis of said bulbous body and to exert sliding friction on a part of the length of each of said cords, and a common connecting member disposed on the side of said sliding member remote from the said flange and having, for each cord, a passage through which said cord may pass between said part of its length and its end, said passages being evenly spaced radial passages symmetrically disposed about the axis of the connecting member.

3. A parachute shroud-line attachment comprising a common sliding member to which the ends of a number of cords may be connected, said sliding member having a separate hole for each of said cords through which the end of said cord may pass for connection to said member and being adapted to engage a part of the length of each of said cords and to exert sliding friction thereon, and a common connecting member having, for each cord, a passage through which said cord may pass between said part of its length and its end, said passages being evenly spaced radial passages symmetrically disposed about the axis of the connecting member.

4. A parachute shroud-line attachment comprising a common sliding member to which the ends of a number of cords may be connected, said member being adapted to engage part of the length of each of said cords and to exert sliding friction thereon, and a common connecting member having, for each cord, a passage through which said cord may pass between said part of its length and its end, said passages being evenly spaced radial passages symmetrically disposed about the axis of the connecting member, said sliding member and said connecting member being adapted to fit snugly against one another when the cords are drawn tight.

5. A parachute shroud-line attachment comprising a common sliding member to which the ends of a number of cords may be connected, said sliding member having a separate hole for each of said cords through which the end of said cord may pass for connection to said member and being adapted to engage a part of the length of each of said cords and to exert sliding friction thereon, and a common connecting member having, for each cord, a passage through which said cord may pass between said part of its length and its end, said passages being evenly spaced radial passages symmetrically disposed about the axis of the connecting member and adapted to lead directly to said holes in said sliding member so that said sliding member and said connecting member may fit snugly against one another when the cords are drawn tight.

6. A parachute shroud-line attachment comprising a common sliding member having a bulbous body with a number of holes therein through which an equal number of cords may be passed in order to be connected to said member, and a flange on one side of said bulbous body having perforations therein through which said cords may pass so as to constrain said cords to pass close to the axis of said bulbous body and to exert sliding friction on a part of the length of each of said cords, and a common connecting member disposed on the side of said sliding member remote from said flange, said connecting member having, for each cord, a passage through which said cord may pass between said part of its length and its end, said passages being evenly spaced radial passages symmetrically disposed about the axis of the connecting member and adapted to lead directly to said holes in the said bulbous body so that said sliding member and said connecting member may fit snugly against one another when the cords are drawn tight.

7. An assembly of shroud-lines for a parachute comprising a plurality of cords, a sliding member common to said cords to which the ends of said cords are connected, said member being adapted to engage a part of the length of each of said cords and to exert sliding friction thereon, and a connecting member common to said cords having, for each cord, a passage through which said cord passes between said part of its length and its end, said passages being evenly spaced radial passages symmetrically disposed about the axis of said connecting member.

8. An assembly of shroud-lines for a parachute comprising a plurality of cords, a sliding member common to said cords, and provided, for each of said cords, with a hole through which said cord passes for attachment to said sliding member, said member being adapted to engage a part of the length of each of said cords and to exert sliding friction thereon, and a connecting member common to said cords having, for each cord, a passage through which said cord passes between said part of its length and its end, said passages being evenly spaced radial passages symmetrically disposed about the axis of said connecting member.

9. An assembly of shroud-lines for a parachute comprising a plurality of cords, a sliding member common to said cords having a bulbous body provided, for each of said cords, with a hole through which said cord passes for attachment to said sliding member, said sliding member having a flange on one side thereof perforated for the passage of each of said cords and adapted to constrain said cord to pass close to the axis of said bulbous body and to exert sliding friction on a part of the length of said cord, and a connecting member common to said cords and having, for each cord, a passage through which said cord passes between said part of its length and its end, said passages being evenly spaced radial passages symmetrically disposed about the axis of the connecting member and adapted to lead said cords directly to the holes in said bulbous body so that said sliding member and said connecting member may fit snugly against one another when said cords are drawn tight.

DONALD FINLAYSON.
ERNEST LESLIE GREENWOOD.
LEONARD LATHAM.